US012811967B2

(12) United States Patent
Benyo

(10) Patent No.: US 12,811,967 B2
(45) Date of Patent: Nov. 24, 2026

(54) SECURITY THREAT INVESTIGATION

(71) Applicant: JAMF Software, LLC, Minneapolis, MN (US)

(72) Inventor: Matthew Benyo, Minneapolis, MN (US)

(73) Assignee: JAMF Software, LLC, Minneapolis, MN (US)

( * ) Notice: Subject to any disclaimer, the term of this patent is extended or adjusted under 35 U.S.C. 154(b) by 62 days.

(21) Appl. No.: 18/823,011

(22) Filed: Sep. 3, 2024

(65) Prior Publication Data

US 2025/0097246 A1 Mar. 20, 2025

Related U.S. Application Data

(60) Provisional application No. 63/582,928, filed on Sep. 15, 2023.

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS

2015/0149948 A1 5/2015 Yun
2016/0149948 A1* 5/2016 Loomis ............... H04L 63/1441 726/23
2018/0189517 A1* 7/2018 Larson ................ G06F 21/6245
2021/0126927 A1* 4/2021 Sundararajan ...... H04L 63/1416
2021/0182388 A1* 6/2021 Myneni .................... G06N 5/04
(Continued)

FOREIGN PATENT DOCUMENTS

AU 2022401895 A1 * 6/2024 ......... H04L 63/1416
CA 3090037 A1 * 2/2021 ............... G06N 5/01
(Continued)

OTHER PUBLICATIONS

International Search Report and Written Opinion issued in PCT Application No. PCT/US24/45017, mailing date Nov. 14, 2024.

*Primary Examiner* — Sarah Su
(74) *Attorney, Agent, or Firm* — Benesch Friedlander Coplan & Aronoff LLP

(57) ABSTRACT

In certain aspects, a computer-implemented method includes receiving an analysis request based on a suspicious activity alert. The method includes extracting, responsive to receiving the analysis request and based on the suspicious activity alert, key details from process data associated with the suspicious activity alert. The method includes identifying telemetry data during a predefined period prior to and after the suspicious activity alert. The method includes retrieving contextual data and organizational data associated with the process data. The method includes generating a prompt based on at least the telemetry data, the contextual data, and the organizational data. The method includes receiving an analysis report, wherein the analysis report identifies, based on the prompt, potential threats and remediation steps.

20 Claims, 9 Drawing Sheets

(56) References Cited

U.S. PATENT DOCUMENTS

| | | | | |
|---|---|---|---|---|
| 2023/0138805 | A1* | 5/2023 | Kumar | H04L 63/0263 726/1 |
| 2024/0007491 | A1* | 1/2024 | Spurlock | G06F 21/554 |
| 2024/0330505 | A1* | 10/2024 | Xu | G06F 21/552 |
| 2025/0023918 | A1* | 1/2025 | Sethi | H04L 63/1425 |
| 2025/0310357 | A1* | 10/2025 | Augé | G06F 16/9024 |
| 2025/0392575 | A1* | 12/2025 | Valeyre | H04L 45/037 |
| 2026/0017386 | A1* | 1/2026 | Ohayon | G06F 21/577 |

FOREIGN PATENT DOCUMENTS

| | | | | |
|---|---|---|---|---|
| CN | 119628874 | A * | 3/2025 | H04L 63/20 |
| CN | 120378146 | A * | 7/2025 | H04L 41/142 |
| CN | 120378153 | A * | 7/2025 | H04L 63/205 |
| KR | 102097305 | B1 * | 5/2020 | H04L 63/1416 |
| KR | 102426889 | B1 * | 7/2022 | G06F 16/25 |
| WO | WO-2021171090 | A1 * | 9/2021 | G06N 7/01 |

* cited by examiner

94

112

System Message

You are a expert macOS cyber security analyst. Your job is to analyze alert data and telemetry that is provided to you for the purpose of generating a hypothesis about the event. You will propose an explanation that covers the circumstances of what occurred, and articulates the reasoning behind the hypothesis, citing specific evidence from the alert data, telemetry and any other additional context that is provided. Lastly, you will provide guidance and suggestions about how a human analyst might investigate further to validate or falsify the given hypothesis. When necessary, provide guidance for remediation actions.

This is very important. This information you provide will be presented in the Jamf Protect Alert UI. Organize the information into these Markdown headings:

Hypothesis [This section should really be the lede of the entire analysis. think of it as TL;DR. What payload was delivered or action taken? (the provided telemetry has the best chance of holding these details) When appropriate come up with a clever metaphor to explain your hypothesis in an intuitive way a beginner would understand.]

Evidence & Reasoning [Make sure the user understands how you formulated your hypothesis and what the implications are. Consider the following questions: "How likely is this to be a false positive based on the evidence?" ]

Investigation & Validation [give some sense of how this hypothesis could be further investigated and validated. Consider the following questions: "Are there any holes in your hypothesis? What alternative explanations should I consider?", "What other data would help you further validate your hypothesis?"]

Ensure any code, critical details and necessary information is formatted appropriately for easy readability. Use Markdown format wherever possible! This will help the end user to easily read and understand the information. Write in paragraphs and avoid lists. Get to the point and don't be verbose. Reading time should be one minute or less.

FIG. 5B

94

114

User Message

Alert Description: osascript executed a script that was piped directly from curl. While this risky action can occur in benign situations, it is a common tactic used by malicious actors as it allows them to operate in memory without writing files to disk that would be otherwise scanned by traditional antivirus.

You will receive JSON event data about this alert. You can assume that the alert means that the script was executed via osascript. Pay attention to signing information as well as process hierarchy when forming the hypothesis.

The telemetry (if provided), will include process execve events that have the osascript are their parent process, therefore their content will be critical in forming an opinion as to whether the event was benign or part of a malicious chain of events. In the event that no telemetry data is provided, your ability to reason about the alert will be very limited. Be sure to make this known in your response.

ALERT JSON: [data provided here]

TELEMETRY DATA: [data provided here]

ADDITIONAL CONTEXT AROUND KNOWN PROCESSES: [matching entries]

USER ROLE CONTEXT: [optional data about user and their role, department, length of tenure, work from home or working from office etc.]

ORGANIZATION CONTEXT: [optional data about the nature of organization (school, financial, software etc]

Use your advanced reasoning capabilities to analyze the event data, telemetry and context. Connect the dots and formulate a well-reasoned hypothesis as to what occurred.

FIG. 5C

SECURITY THREAT INVESTIGATION

CROSS-REFERENCE TO RELATED APPLICATION

The present application claims the benefit of priority under 35 U.S.C. § 119 from U.S. Provisional Patent Application Ser. No. 63/582,928 entitled "Security Threat Investigation," filed on Sep. 15, 2023, the disclosure of which is hereby incorporated by reference in its entirety for all purposes.

TECHNICAL FIELD

The present disclosure generally relates to cybersecurity, and more specifically relates to security threat investigation.

BACKGROUND

Many organizations manage numerous end user devices that are under their purview. Cybersecurity teams at these organizations face an overwhelming volume of behavior-based security alerts that require time-consuming manual investigation due to lack of context. There are an endless number of edge cases that can trigger alerts which turn out to be false positives. Some organizations lack the skilled security analysts needed to quickly investigate and respond to various threats (e.g., MacOS-specific threats). Generally, cybersecurity expertise is scarce and difficult to hire. Current cybersecurity tools are typically reactive and binary. For example, such cybersecurity tools detect threats but do not provide insights into investigating alerts. As such, analysts are often times left on their own to figure out potential hypotheses and validation steps. Accordingly, there is a need to accelerate cyber security investigations to determine whether a security alert is a genuine threat, as opposed to a false positive, and to provide appropriate responses to these genuine threats in a timely fashion to reduce the risk and impact of security incidents across an organization.

The description provided in the background section should not be assumed to be prior art merely because it is mentioned in or associated with the background section. The background section may include information that describes one or more aspects of the subject technology.

SUMMARY

According to certain aspects of the present disclosure, a computer-implemented method for security threat investigation is provided. The method includes receiving an analysis request based on a suspicious activity alert. The method includes extracting, responsive to receiving the analysis request and based on the suspicious activity alert, key details from process data associated with the suspicious activity alert. The method includes identifying telemetry data during a predefined period prior to and after the suspicious activity alert. The method includes retrieving contextual data and organizational data associated with the process data. The method includes generating a prompt based on at least the telemetry data, the contextual data, and the organizational data. The method includes receiving an analysis report, wherein the analysis report identifies, based on the prompt, potential threats and remediation steps.

According to other aspects of the present disclosure, a system is provided. The system includes a memory comprising instructions and a processor configured to execute the instructions which, when executed, cause the processor to receive an analysis request based on a suspicious activity alert. The processor is configured to execute the instructions which, when executed, cause the processor to extract, responsive to receiving the analysis request and based on the suspicious activity alert, key details from process data associated with the suspicious activity alert. The processor is configured to execute the instructions which, when executed, cause the processor to identify telemetry data during a predefined period prior to and after the suspicious activity alert. The processor is configured to execute the instructions which, when executed, cause the processor to retrieve contextual data and organizational data associated with the process data. The processor is configured to execute the instructions which, when executed, cause the processor to generate a prompt based on at least the telemetry data, the contextual data, and the organizational data. The processor is configured to execute the instructions which, when executed, cause the processor to receive an analysis report, wherein the analysis report identifies, based on the prompt, potential threats and remediation steps.

According to other aspects of the present disclosure, a non-transitory machine-readable storage medium comprising machine-readable instructions for causing a processor to execute a method is provided. The method includes receiving an analysis request based on a suspicious activity alert. The method includes extracting, responsive to receiving the analysis request and based on the suspicious activity alert, key details from process data associated with the suspicious activity alert. The method includes identifying telemetry data during a predefined period prior to and after the suspicious activity alert. The method includes retrieving contextual data and organizational data associated with the process data. The method includes generating a prompt based on at least the telemetry data, the contextual data, and the organizational data. The method includes receiving an analysis report, wherein the analysis report identifies, based on the prompt, potential threats and remediation steps.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. It should be noted that although various aspects may be described herein with reference to healthcare, retail, educational, or corporate settings, these are examples only and are not to be considered limiting. The teachings of the present disclosure may be applied to any mobile device environments, including but not limited to home environments, healthcare environments, retail environments, educational environments, corporate environments, and other appropriate environments. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIGS. 5A-5C are example illustrations associated with the example processes of FIG. 3.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Traditional cybersecurity tools detect threats but do not provide insights into investigating alerts. The disclosed technology provides a solution to such traditional approaches. For example, the disclosed technology accelerates investigation and response by interactively generating hypotheses and investigation steps tailored to each MacOS security alert. Moreover, the disclosed technology uniquely generates prompts, which leverages modern natural language AI to mimic human-level reasoning in analyzing alerts and guiding next steps. As such, the productivity of cybersecurity teams is amplified and dependence on scarce cybersecurity expertise is reduced. By accelerating response, the disclosed technology reduces the risk and impact of cybersecurity incidents in an organization.

Figure 1:
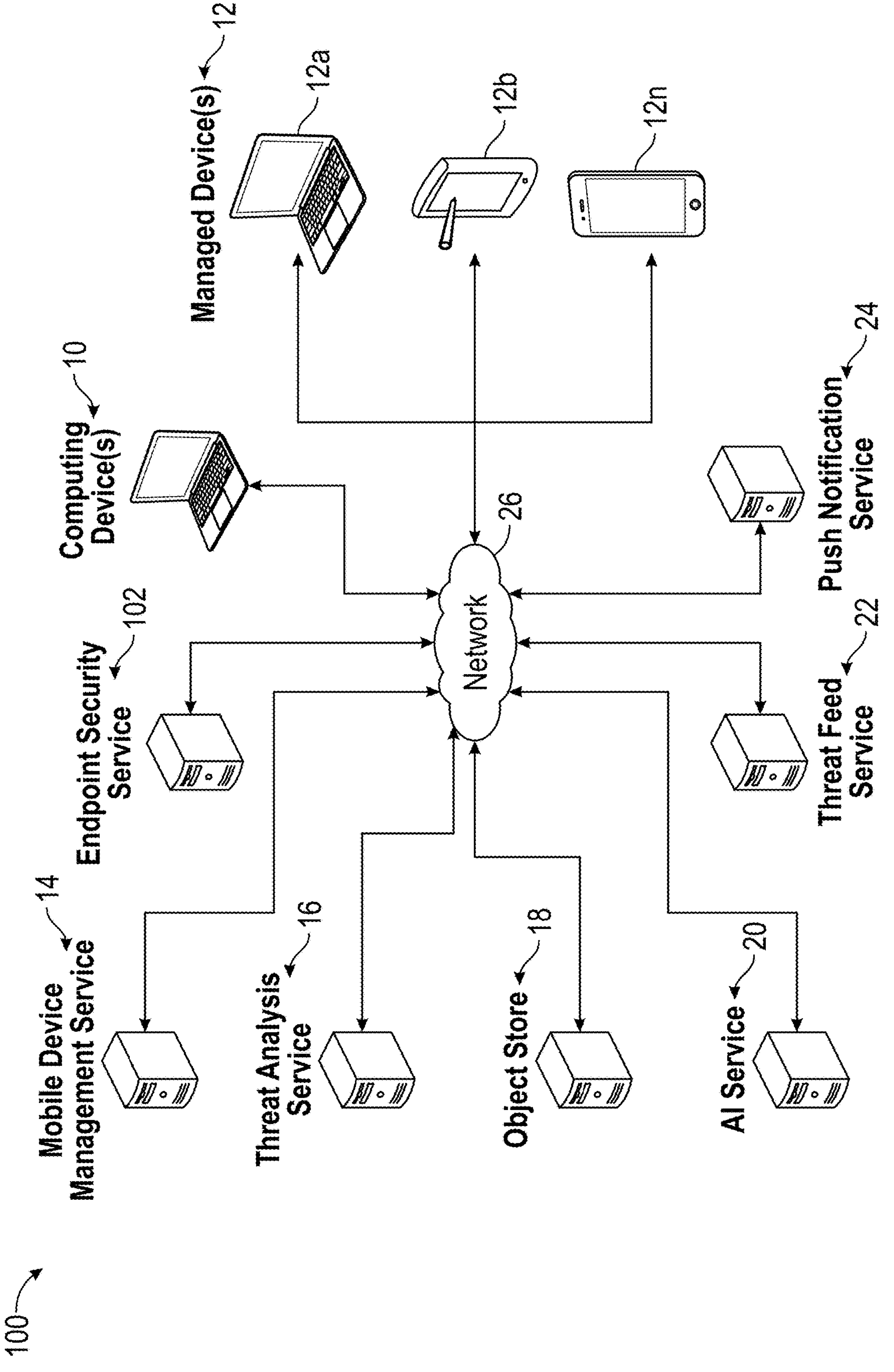
FIG. 1 illustrates an example architecture for security threat investigation.

FIG. 1 illustrates an example architecture 100 for security threat investigation. For example, the architecture 100 includes at least one computing device 10, at least one managed device 12, such as a first managed device 12*a* and a second managed device 12*b* to an nth managed device 12*n*, a mobile device management service 14, a threat analysis service 16, an object store 18, an artificial intelligence (AI) service 20, a threat feed service 22, a push notification service 24, and an endpoint security service 102 all connected over a network 26. In certain aspects, the mobile device management service 14 may be connected to the push notification service 24 over a separate network.

The mobile device management service 14 can be any device having an appropriate processor, memory, and communications capability for communicating with the at least one computing device 10, the at least one managed device 12, the threat analysis service 16, and the push notification service 24. For purposes of load balancing, the mobile device management service 14 may include multiple servers. The threat analysis service 16 can be any device having an appropriate processor, memory, and communications capability for communicating with, at least, the at least one computing device 10, the mobile device management service 14, the object store 18, the AI service 20, and the threat feed service 22. The AI service 20 can be any device having an appropriate processor, memory, and communications capability for communicating with, at least, the at least one computing device 10, the threat analysis service 16, and the threat feed service 22. The threat feed service 22 can be any device having an appropriate processor, memory, and communications capability for communicating with, at least, the at least one computing device 10, the threat analysis service 16, and the AI service 20. The push notification service 24 can be any device having an appropriate processor, memory, and communications capability for communicating with the mobile device management service 14 and the at least one managed device 12. The endpoint security service 102 can be any device having an appropriate processor, memory, and communications capability for communicating with the at least one computing device 10, the threat analysis service 16, and the object store 18.

The object store 18 can be any device having an appropriate processor, memory, and communications capability for communicating with, at least, the at least one computing device 10 and the threat analysis service 16. The object store 18 can be, but is not limited to, any appropriate object-based storage device for managing data as objects.

The at least one computing device 10, to which the mobile device management service 14 and the threat analysis service 16 communicates with over the network 26, can be, for example, a tablet computer, a mobile phone, a mobile computer, a laptop computer, a portable media player, an electronic book (eBook) reader, or any other device having appropriate processor, memory, and communications capabilities. Similarly, the at least one managed device 12, such as the first managed device 12*a* and the second managed device 12*b*, to which the mobile device management service 14 communicates with over the network 26 via the push notification service 24, can be, for example, a tablet computer, a mobile phone, a mobile computer, a laptop computer, a portable media player, an electronic book (eBook) reader, or any other device having appropriate processor, memory, and communications capabilities. In certain aspects, the mobile device management service 14, the threat analysis service, the object store 18, the AI service 20, the threat feed service 22, and the push notification service 24 can be a cloud computing server of an infrastructure-as-a-service (IaaS) and be able to support a platform-as-a-service (PaaS) and software-as-a-service (SaaS) services.

It should be noted that although one computing device 10 and two managed devices, such as the first managed device 12*a* and the second managed device 12*b* to the nth managed device 12*n*, are shown in FIG. 1, the present disclosure is not limited to any particular configuration or number of devices. In certain aspects, a different number of manager devices and/or managed devices may be present.

The network 26 can include, for example, any one or more of a personal area network (PAN), a local area network (LAN), a campus area network (CAN), a metropolitan area network (MAN), a wide area network (WAN), a broadband network (BBN), the Internet, and the like. Further, the network 26 can include, but is not limited to, any one or more of the following network topologies, including a bus network, a star network, a ring network, a mesh network, a star-bus network, tree or hierarchical network, and the like.

Figure 2:
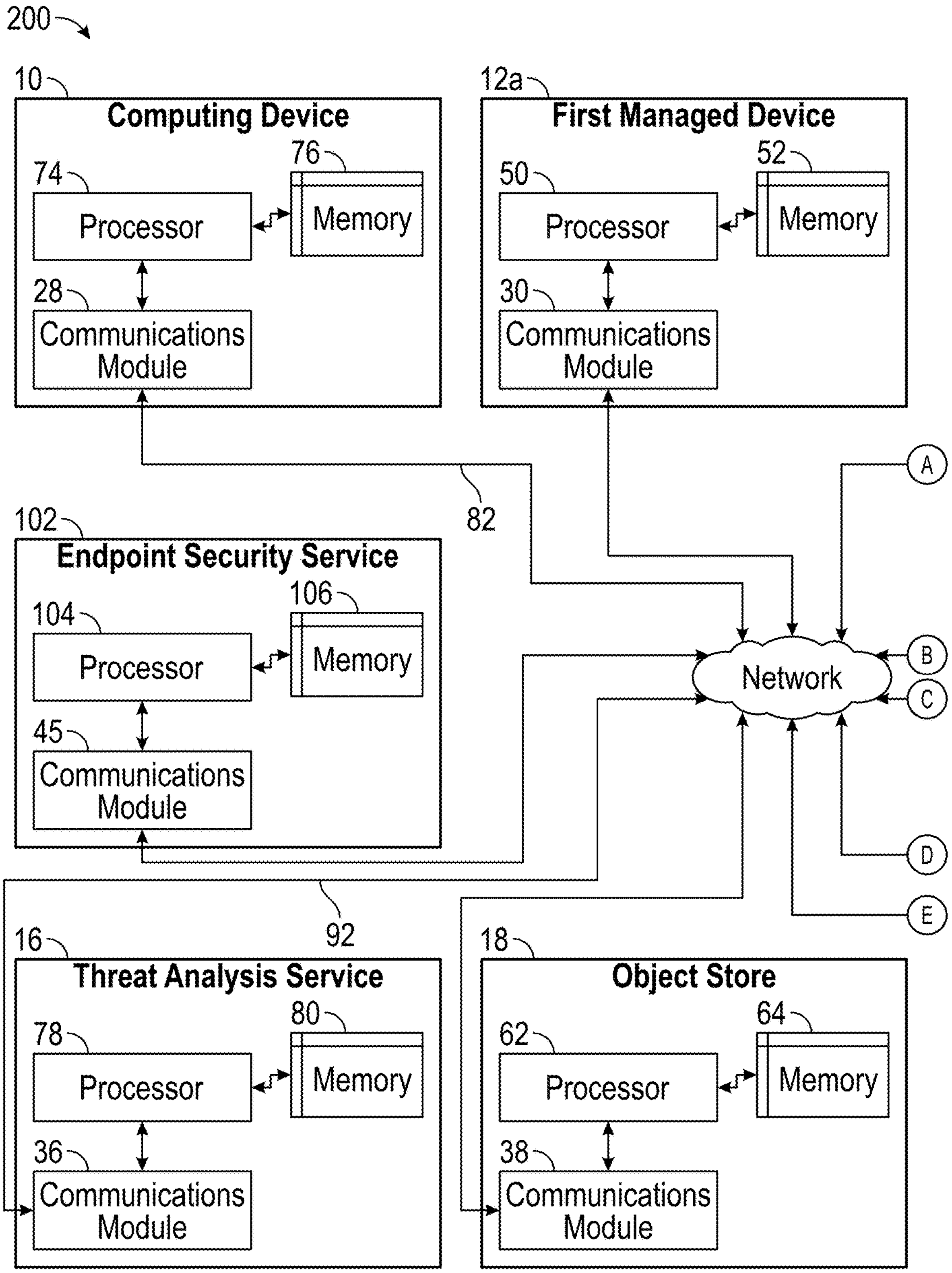
FIG. 2 is a block diagram illustrating the example computing device, first managed device, second managed device, mobile device management service, threat analysis service, object store, AI service, threat feed service, push notification service, and the endpoint security service from the architecture of FIG. 1 according to certain aspects of the disclosure.
Figure 2:
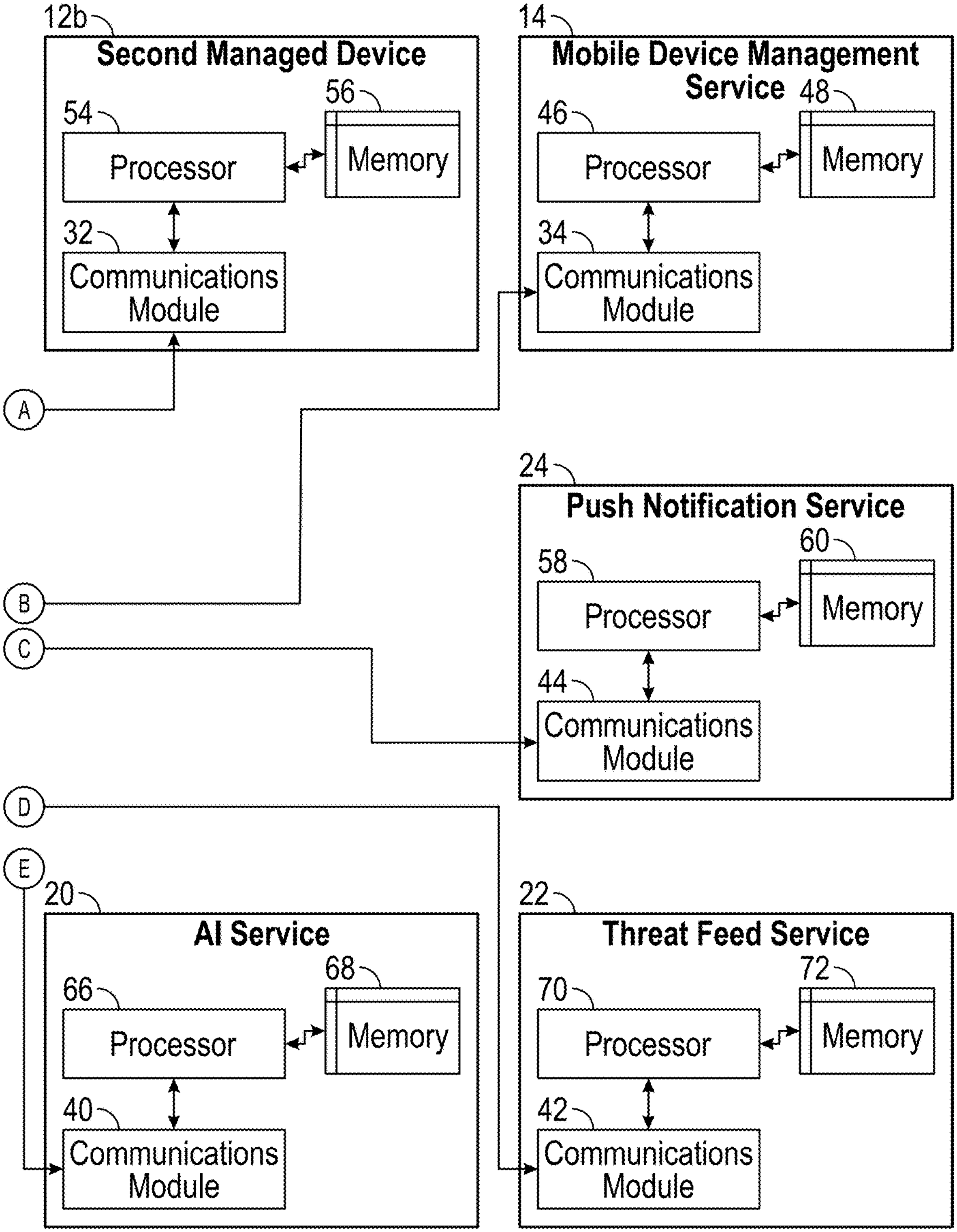

FIG. 2 is a block diagram 200 illustrating examples of the at least one computing device 10, the first managed device 12*a*, the second managed device 12*b*, the mobile device management service 14, the threat analysis service 16, the object store 18, the AI service 20, the threat feed service 22, and the push notification service 24 in the architecture of FIG. 1 according to certain aspects of the disclosure. It should be understood that for purposes of explanation the first managed device 12*a* and the second managed device 12*b* are described, but any number of the at least one managed device 12 could be used.

The at least one computing device 10, the first managed device 12*a*, the second managed device 12*b*, the mobile device management service 14, the threat analysis service 16, the object store 18, the AI service 20, the threat feed service 22, the push notification service 24, and the endpoint security service 102 are connected over the network 26 via respective communication modules 28, 30, 32, 34, 36, 38, 40, 42, 44, 45. The communication modules 28, 30, 32, 34, 36, 38, 40, 42, 44, 45 are configured to interface with the network 26 to send and receive information, such as data, requests, responses, and commands to other devices on the network 26. The communications modules 28, 30, 32, 34, 36, 38, 40, 42, 44, 45 can be, for example, modems or Ethernet cards.

The mobile device management service 14 includes a processor 46, the communications module 34, and a memory 48. The processor 46 of the mobile device management service 14 is configured to execute instructions, such as instructions physically coded into the processor 46, instructions received from software in the memory 48, or a combination of both.

The mobile device management service 14 may correspond to hardware and/or software that implement mobile device management functions. For example, the mobile device management service 14 may manage the at least one managed device 12, such as the first managed device 12*a* and the second managed device 12*b*. As such, the mobile device management service 14 may store (or access) inventory and grouping data associated with the at least one managed device 12. The inventory and grouping data may include enrollee data identifying all mobile devices that are managed by the mobile device management service 14, as well as data (e.g., configured task window settings) associated with the at least one managed device 12 including the first managed device 12*a*, and the second managed device 12*b* to the nth managed device 12*n*, and grouping information of managed devices within the same designated group.

The first managed device 12*a* includes a processor 50, the communications module 30, and a memory 52. The processor 50 of the first managed device 12*a* is configured to execute instructions, such as instructions physically coded into the processor 50, instructions received from software in memory 52, or a combination of both.

The second managed device 12*b* includes a processor 54, the communications module 32, and a memory 56. The processor 54 of the second managed device 12*b* is configured to execute instructions, such as instructions physically coded into the processor 54, instructions received from software in memory 56, or a combination of both.

The push notification service 24 includes a processor 58, the communications module 44, and a memory 60. The processor 58 of the push notification service 24 is configured to execute instructions, such as instructions physically coded into the processor 58, instructions received from software in the memory 60, or a combination of both.

The object store 18 includes a processor 62, the communications module 38, and a memory 64. The processor 62 of the object store 18 is configured to execute instructions, such as instructions physically coded into the processor 62, instructions received from software in the memory 64, or a combination of both.

The AI service 20 includes a processor 66, the communications module 40, and a memory 68. The processor 66 of the AI service 20 is configured to execute instructions, such as instructions physically coded into the processor 66, instructions received from software in the memory 68, or a combination of both.

The threat feed service 22 includes a processor 70, the communications module 42, and a memory 72. The processor 70 of the threat feed service 22 is configured to execute instructions, such as instructions physically coded into the processor 70, instructions received from software in the memory 72, or a combination of both.

The at least one computing device 10 includes a processor 74, the communications module 28, and a memory 76. The processor 74 of the at least one computing device 10 is configured to execute instructions, such as instructions physically coded into the processor 74, instructions received from software in memory 76, or a combination of both.

The threat analysis service 16 includes a processor 78, the communications module 36, and a memory 80. The processor 78 of the threat analysis service 16 is configured to execute instructions, such as instructions physically coded into the processor 78, instructions received from software in memory 80, or a combination of both. The processor 78 of the threat analysis service 16 is configured to receive an analysis request based on a suspicious activity alert identified on the at least one computing device 10. The processor 78 of the threat analysis service 16 is configured to extract, responsive to receiving the analysis request and based on the suspicious activity alert, process data associated with the suspicious activity alert. The processor 78 of the threat analysis service 16 is configured to identify telemetry data during a predefined period prior to and after the suspicious activity alert. The processor 78 of the threat analysis service 16 is configured to retrieve contextual data and organizational data associated with the process data. The processor 78 of the threat analysis service 16 is configured to generate a prompt based on at least the telemetry data, the contextual data, and the organizational data. The processor 78 of the threat analysis service 16 is configured to receive an analysis report, wherein the analysis report identifies, based on the prompt, potential threats and remediation steps.

The endpoint security service 102 includes a processor 104, the communications module 45, and a memory 106. The processor 104 of the endpoint security service 102 is configured to execute instructions, such as instructions physically coded into the processor 104, instructions received from software in memory 106, or a combination of both. The processor 104 of the endpoint security service 102 is configured to detect suspicious activity and transmit a suspicious activity alert 84 to the at least one computing device 10 for display via a graphical user interface (GUI) 108.

It should be noted that although various embodiments may be described herein with reference to healthcare and educational settings, this is for example only and not to be considered limiting. The teachings of the present disclosure may be applied in other mobile device environments, including but not limited to home environments, corporate environments, retail environments, government environments, organization environments, and other well-known environments.

Figure 3:
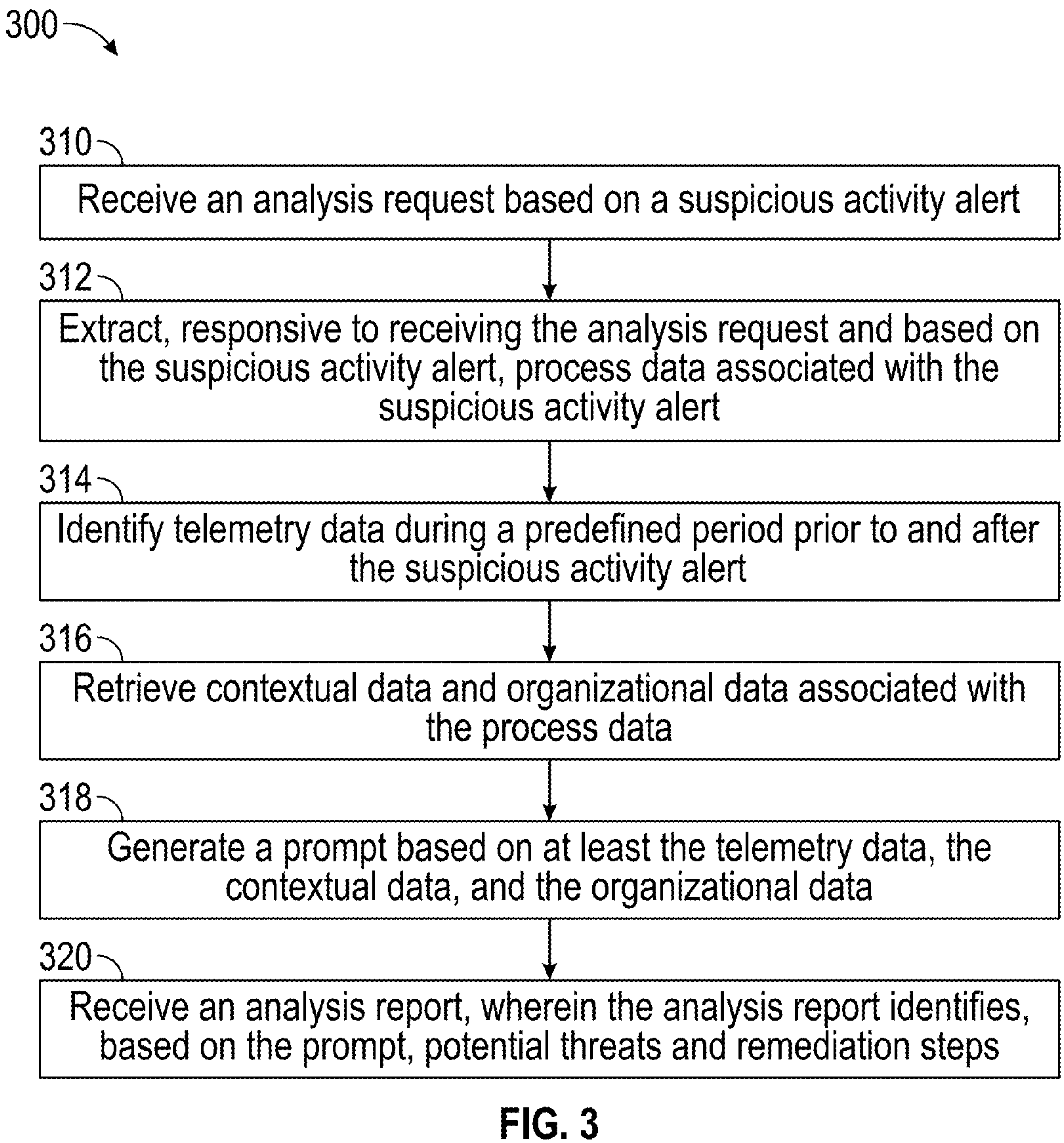
FIG. 3 illustrates an example process for security threat investigation using the example devices of FIG. 2.

FIG. 3 illustrates an example process 300 using the computing device 10, the threat analysis service 16, the object store 18, and, in certain aspects, the AI service 20, and the threat feed service 22. While FIG. 3 is described with reference to FIG. 2, it should be understood that the process steps of FIG. 3 may be performed by other systems.

The process 300 begins by proceeding to step 310 when the processor 78 of the threat analysis service 16 receives an analysis request 82 from the at least one computing device 10 based on a suspicious activity alert 84. The suspicious activity alert 84 is received by the at least one computing device 10. As depicted at step 312, the processor 78 of the threat analysis service 16 extracts, responsive to receiving the analysis request 82 and based on the suspicious activity alert 84, process data 86 associated with the suspicious activity alert 84. The processor 78 of the threat analysis service 16 identifies telemetry data 88 during a predefined period prior to and after the suspicious activity alert 84, as depicted at step 314.

As illustrated at step 316, the processor 78 of the threat analysis service 16 retrieves contextual data 90 and organizational data 92 associated with the process data 86. The processor 78 of the threat analysis service 16 generates a prompt 94 based on at least the telemetry data 88, the contextual data 90, and the organizational data 92, as depicted at step 318. As illustrated at step 320, the processor 78 of the threat analysis service 16 receives an analysis report 96, wherein the analysis report 96 identifies, based on the prompt 94, potential threats 98 and remediation steps 100.

Figure 4:
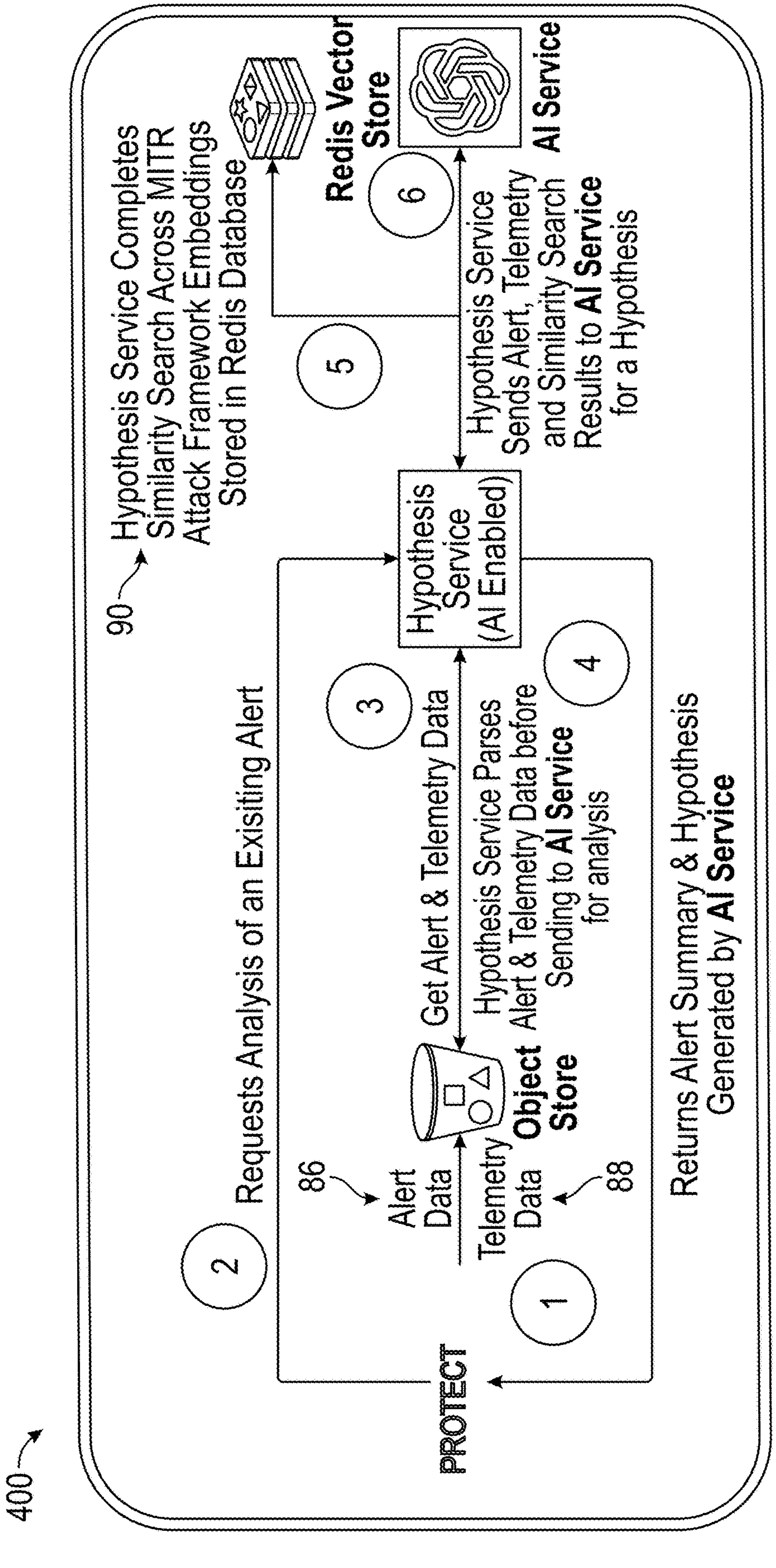
FIG. 4 illustrates an example flow of the architecture for security threat investigation of FIG. 1.

FIG. 4 illustrates an example flow 400 of the architecture for security threat investigation of FIG. 1.

An example will now be described with reference to the example process 300 of FIG. 3, the example flow of the architecture for security threat investigation of FIG. 4, and the example illustrations of FIGS. 5A-5C associated with the example process of FIG. 3.

Figure 5A:
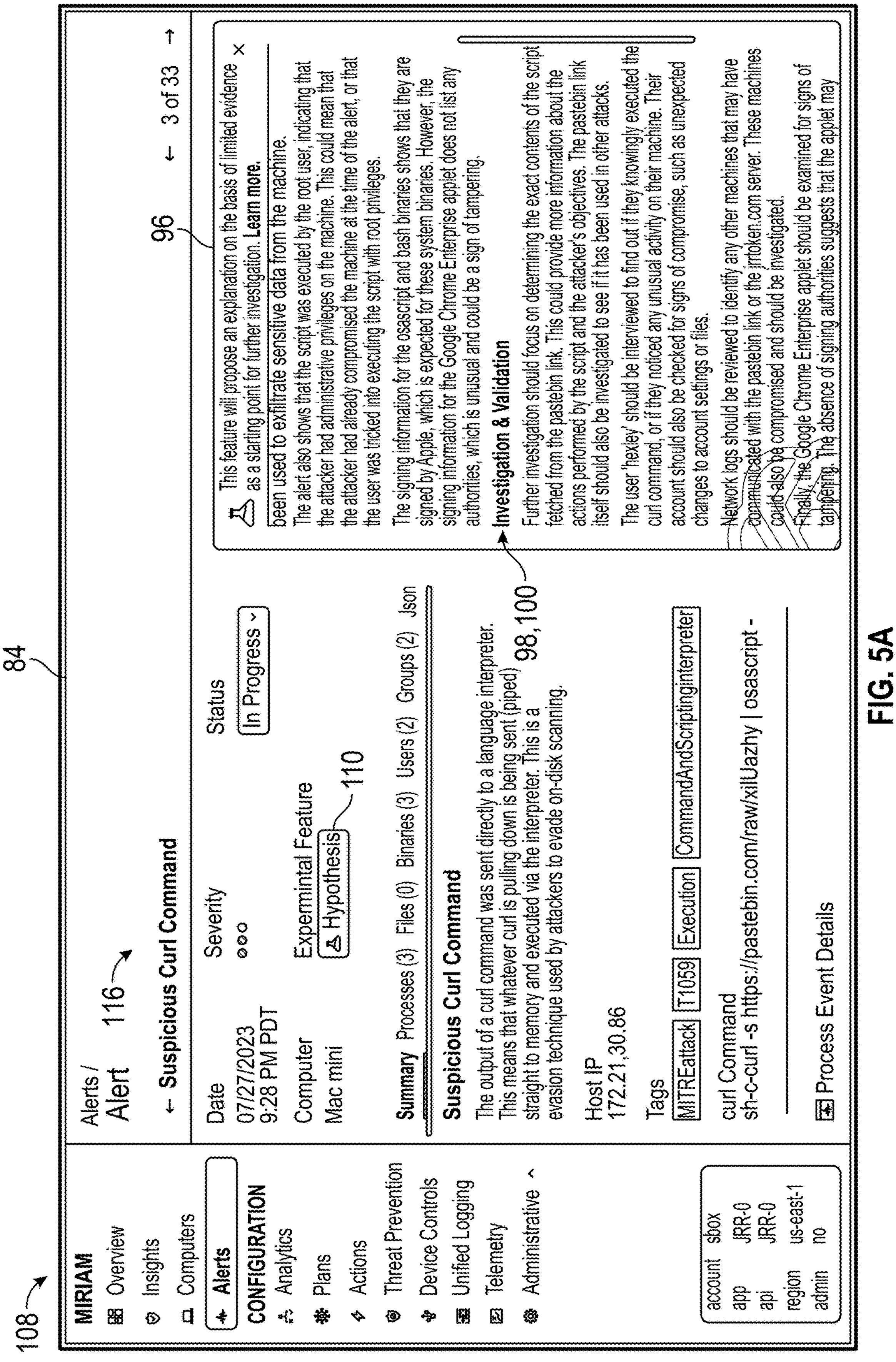

When the endpoint security service 102 detects a suspicious activity, the suspicious activity alert 84 is triggered and transmitted to the at least one computing device 10 for display via the GUI 108, as illustrated in FIG. 5A. A button 110, displayed via the GUI 108, can be initiated by an analyst using the at least one computing device 10 in order to initiate and transmit the analysis request 82 associated with the suspicious activity alert 84 to the threat analysis service 16. In certain aspects, the endpoint security service 102 transmits the process data 86 (e.g., alert data) and the telemetry data 88 to the object store 18.

Responsive to receiving the analysis request 82, the threat analysis service 16 retrieves the process data 86 and the telemetry data 88 from the object store 18. Once the process data 86 and the telemetry data 88 is retrieved, and in response to receiving the analysis request 82, the threat analysis service 16 extracts key details from the process data 86 about the suspicious activity alert 84 such as, but not limited to, process IDs, code signing info, users, command line arguments for each process associated with the suspicious activity alert 84, and other appropriate details. Further, the threat analysis service 16 identifies relevant endpoint telemetry from the telemetry data 88 received from the object store 18. For example, the threat analysis service 16 can identify the telemetry data 88 during a predefined period prior to and after detection of the suspicious activity alert 84 with a focus on relevant factors such as, but not limited to, related processes, users, network activity, and other appropriate factors. In certain aspects, the threat analysis service 16 parses the process data 86 and the telemetry data 88.

The threat analysis service 16 also searches intelligence databases, such as the threat feed service 22, for example, to retrieve related information (e.g., the contextual data 90) associated with the process data 86 such as, but not limited to, security research, malware tactics, techniques, and procedures (TTPs), other context related to the involved processes and behaviors, and other appropriate contextual data. Furthermore, the threat analysis service 16 retrieves the organizational data 92 associated with the process data 86, which it already has access to via a database of the organization, such as, but not limited to, industry, VPN usage, admin rights, security team proficiency, and other appropriate organizational data.

The threat analysis service 16 utilizes the process data 86 and the telemetry data 88 received from the object store 18 as well as the contextual data 90 and the organizational data 92 to formulate or generate the prompt 94. The prompt 94 is carefully constructed to ask the model (e.g., the AI service 20) to analyze the event, which triggered the suspicious activity alert 84, from an attacker mindset and generate a hypothesis or analysis (e.g., the analysis report 96) explaining the most likely scenario, including if a benign explanation is more plausible. Moreover, at least the process data 86 and the telemetry data 88 received from the object store 18, as well as the contextual data 90 and the organizational data 92, is processed to derive meaningful context and guidance for generating the prompt 94. The prompt 94 is formed of a system message 112, as illustrated in FIG. 5B, and a user message 114, as illustrated in FIG. 5C. In certain aspects, the system message 112 is static such that it will be same for all detected events that trigger the suspicious activity alert 84. In contrast, the user message 114 is dynamically generated based on the specific detected event that triggers the suspicious activity alert 84 such that the process data 86 and the telemetry data 88 received from the object store 18 as well as the contextual data 90 and the organizational data 92 can be used to generate the user message 114.

The system message 112 includes, for example, but is not limited to, basic job description to prime the model (e.g., the AI service 20) as how to behave and respond, direction with extra emphasis on how the response or analysis (e.g., the analysis report 96) should be formatted and the context in which it will be consumed, explicit instructions in the layout and headings with questions to consider in order to prime the model (e.g., the AI service 20) to analyze the data provided in the user message 114, which will stimulate and simulate critical thinking, repetition and specificity instructions around formatting in the response or analysis (e.g., the analysis report 96) to ensure a level of consistency, and other appropriate instructions or directions.

The user message 114 includes, for example, but is not limited to, information about the suspicious activity alert 84 itself (e.g., relevance as part of a malicious chain of events and any other additional context), instruction and priming what to look for in the process data 86 and the telemetry data 88, brief entries describing known macOS processes regarding their behaviors, patterns, and history of use by malicious actors, the contextual data 90, the organizational data 92, the process data 86 received from the object store 18, the telemetry data 88 received from the object store 18, a final directive with emphasis on reasoning capabilities, and other appropriate instruction or directions.

Responsive to receiving the prompt 94, the AI service 20 produces a detailed hypothesis (e.g., the analysis report 96). In certain aspects, the analysis report 96 is displayed on the at least one computing device 10, via the GUI 108, adjacent to event information 116 associated with an event or threat that triggered the suspicious activity alert 84, as depicted in FIG. 5A. In certain aspects, the analysis report 96 includes, but is not limited to, an overview section, a reasoning section, a validation steps section, a section identifying the potential threats 98, a section itemizing the remediation steps 100, and other appropriate information.

In certain aspects, after the analyst interprets the analysis report 96, the analyst can utilize the at least one computing device 10 to remediate the security threat on the first managed device 12*a*, for example, via the mobile device management service 14.

Figure 6:
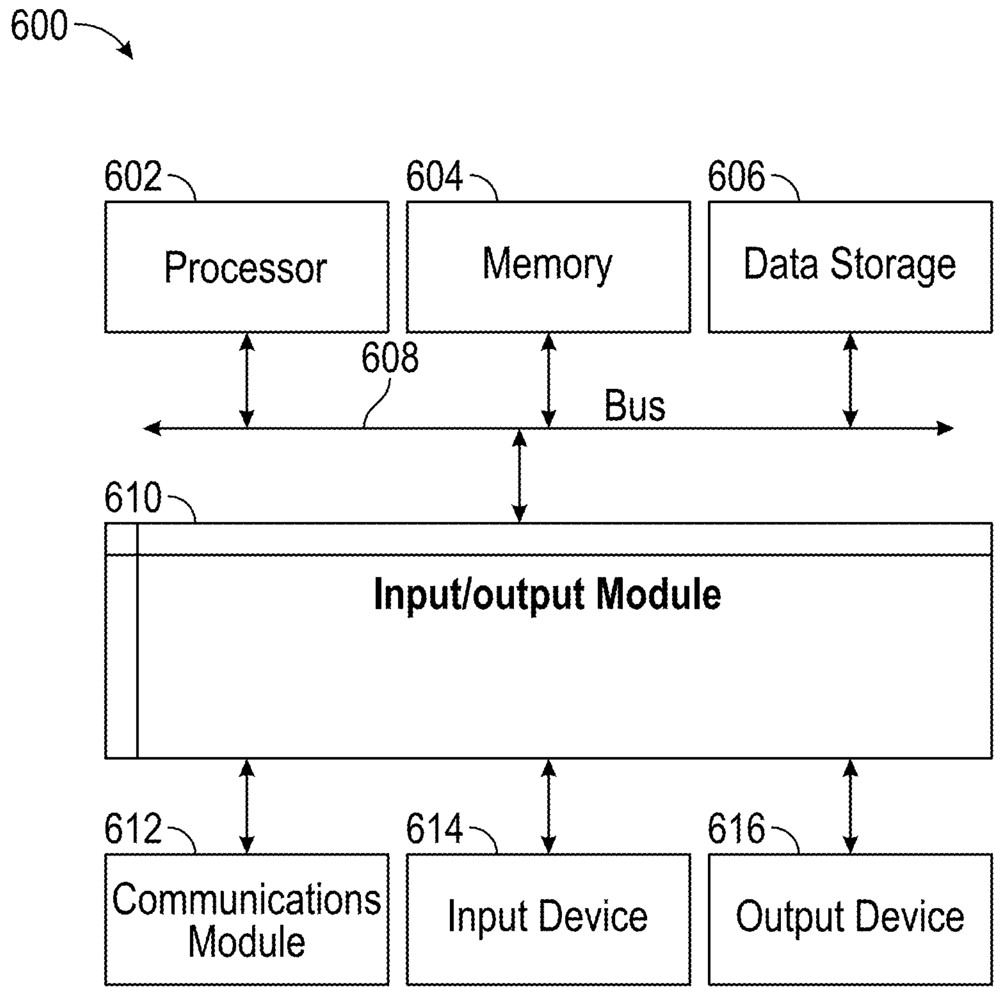
FIG. 6 is block diagram illustrating an example computer system with which the computing device, first managed device, second managed device, mobile device management service, threat analysis service, object store, AI service, threat feed service, push notification service, and the endpoint security service of FIG. 2 can be implemented.

FIG. 6 is a block diagram illustrating an example computer system 600 with which the at least one computing device 10, the first managed device 12*a*, the second managed device 12*b*, the mobile device management service 14, the threat analysis service 16, the object store 18, the AI service 20, the threat feed service 22, the push notification service 24, and the endpoint security service 102 of FIG. 2 can be implemented. In certain aspects, the computer system 600 may be implemented using hardware or a combination of software and hardware, either in a dedicated server, or integrated into another entity, or distributed across multiple entities.

Computer system 600 (e.g., the at least one computing device 10, the first managed device 12*a*, the second managed device 12*b*, the mobile device management service 14, the threat analysis service 16, the object store 18, the AI service 20, the threat feed service 22, the push notification service 24, the endpoint security service 102) includes a bus 608 or other communication mechanism for communicating information, and a processor 602 (e.g., the processor 46, 50, 54, 58, 62, 66, 70, 74, 78, 104) coupled with bus 608 for processing information. According to one aspect, the computer system 600 can be a cloud computing server of an IaaS that is able to support PaaS and SaaS services.

Computer system 600 can include, in addition to hardware, code that creates an execution environment for the computer program in question, e.g., code that constitutes processor firmware, a protocol stack, a database management system, an operating system, or a combination of one or more of them stored in an included memory 604 (e.g., the memory 48, 52, 56, 60, 64, 68, 72, 76, 80, 106), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 608 for storing information and instructions to be executed by processor 602. The processor 602 and the memory 604 can be supplemented by, or incorporated in, special purpose logic circuitry.

The instructions may be stored in the memory 604 and implemented in one or more computer program products, e.g., one or more modules of computer program instructions encoded on a computer readable medium for execution by, or to control the operation of, the computer system 600.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 600 further includes a data storage device 606 such as a magnetic disk or optical disk, coupled to bus 608 for storing information and instructions. Computer system 600 may be coupled via input/output module 610 to various devices. The input/output module 610 can be any input/output module. Example input/output modules 610 include data ports such as USB ports. In addition, input/output module 610 may be provided in communication with processor 602, so as to enable near area communication of computer system 600 with other devices. The input/output module 610 may provide, for example, for wired communication in some implementations, or for wireless communication in other implementations, and multiple interfaces may also be used. The input/output module 610 is configured to connect to a communications module 612. Example communications modules 612 (e.g., the communications module 28, 30, 32, 34, 36, 38, 40, 42, 44, 45) include networking interface cards, such as Ethernet cards and modems.

In certain aspects, the input/output module 610 is configured to connect to a plurality of devices, such as an input device 614 and/or an output device 616. Example input devices 614 include a keyboard and a pointing device, e.g., a mouse or a trackball, by which a user can provide input to the computer system 600. Other kinds of input devices 614 can be used to provide for interaction with a user as well, such as a tactile input device, visual input device, audio input device, or brain-computer interface device.

According to one aspect of the present disclosure the at least one computing device 10, the first managed device 12*a*, the second managed device 12*b*, the mobile device management service 14, the threat analysis service 16, the object store 18, the AI service 20, the threat feed service 22, the push notification service 24, and the endpoint security service 102 can be implemented using a computer system 600 in response to processor 602 executing one or more sequences of one or more instructions contained in memory 604. Such instructions may be read into memory 604 from another machine-readable medium, such as data storage device 606. Execution of the sequences of instructions contained in main memory 604 causes processor 602 to perform the process steps described herein. One or more processors in a multi-processing arrangement may also be employed to execute the sequences of instructions contained in memory 604. Processor 602 may process the executable instructions and/or data structures by remotely accessing the computer program product, for example by downloading the executable instructions and/or data structures from a remote server through communications module 612 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects a user of systems and methods as disclosed herein may perform at least some of the steps by accessing a cloud server through a network connection. Further, data files, circuit diagrams, performance specifications and the like resulting from the disclosure may be stored in a database server in the cloud-computing environment, or may be downloaded to a private storage device from the cloud-computing environment.

The term "machine-readable storage medium" or "computer-readable medium" as used herein refers to any medium or media that participates in providing instructions or data to processor 602 for execution. The term "storage medium" as used herein refers to any non-transitory media that store data and/or instructions that cause a machine to operate in a specific fashion. Such a medium may take many forms, including, but not limited to, non-volatile media, volatile media, and transmission media.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire and fiber optics, including the wires that comprise bus 608. Transmission media can also take the form of acoustic or light waves, such as those generated during radio-wave and infra-red data communications. Furthermore, as used in this specification of this application, the terms "computer", "server", "processor", and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in either one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software or a combination of hardware and software depends upon the particular application and design constraints imposed on the overall system. Skilled artisans may implement the described functionality in varying ways for each particular application.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for security threat investigation, comprising:

receiving an analysis request based on a suspicious activity alert;

extracting, responsive to receiving the analysis request and based on the suspicious activity alert, key details from process data associated with the suspicious activity alert;

identifying telemetry data during a predefined period prior to and after the suspicious activity alert;

retrieving contextual data and organizational data associated with the process data;

generating a prompt constructed to ask an AI service to analyze an event that triggered the suspicious activity alert, wherein the prompt is based on at least the telemetry data, the contextual data, and the organizational data; and receiving an analysis report, wherein the analysis report identifies, based on the prompt, potential threats and remediation steps.

2. The computer-implemented method of claim 1, wherein generating the prompt is based on derived context and guidance of at least the telemetry data, the contextual data, and the organizational data.

3. The computer-implemented method of claim 1, wherein the key details comprise one of process IDs, code signing information, users, and command line arguments for each process associated with the suspicious activity alert.

4. The computer-implemented method of claim 1, wherein identifying the telemetry data comprises focusing on relevant factors comprising one of related processes, users, and network activity.

5. The computer-implemented method of claim 1, further comprising searching a threat feed service to retrieve related information associated with the process data.

6. The computer-implemented method of claim 5, wherein the related information comprises one of security research and malware tactics, techniques, and procedures.

7. The computer-implemented method of claim 1, wherein the prompt comprises a system message and a user message, wherein the system message is static and the user message is dynamically generated based on a detected event that triggers the suspicious activity alert.

8. A system comprising:

a memory comprising instructions; and a processor configured to execute the instructions which, when executed, cause the processor to:

receive an analysis request based on a suspicious activity alert;

extract, responsive to receiving the analysis request and based on the suspicious activity alert, key details from process data associated with the suspicious activity alert;

identify telemetry data during a predefined period prior to and after the suspicious activity alert;

retrieve contextual data and organizational data associated with the process data;

generate a prompt constructed to ask an AI service to analyze an event that triggered the suspicious activity alert, wherein the prompt is based on at least the telemetry data, the contextual data, and the organizational data; and receive an analysis report, wherein the analysis report identifies, based on the prompt, potential threats and remediation steps.

9. The system of claim 8, wherein the prompt is based on derived context and guidance of at least the telemetry data, the contextual data, and the organizational data.

10. The system of claim 8, wherein the key details comprise one of process IDs, code signing information, users, and command line arguments for each process associated with the suspicious activity alert.

11. The system of claim 8, wherein identifying the telemetry data comprises focusing on relevant factors comprising one of related processes, users, and network activity.

12. The system of claim 8, wherein the processor is further configured to execute the instructions which, when executed, cause the processor to search a threat feed service to retrieve related information associated with the process data.

13. The system of claim 12, wherein the related information comprises one of security research and malware tactics, techniques, and procedures.

14. The system of claim 8, wherein the prompt comprises a system message and a user message, wherein the system message is static and the user message is dynamically generated based on a detected event that triggers the suspicious activity alert.

15. A non-transitory machine-readable storage medium comprising machine-readable instructions for causing a processor to execute a method, the method comprising:

receiving an analysis request based on a suspicious activity alert;

extracting, responsive to receiving the analysis request and based on the suspicious activity alert, key details from process data associated with the suspicious activity alert;

identifying telemetry data during a predefined period prior to and after the suspicious activity alert;

retrieving contextual data and organizational data associated with the process data;

generating a prompt constructed to ask an AI service to analyze an event that triggered the suspicious activity alert, wherein the prompt is based on at least the telemetry data, the contextual data, and the organizational data; and receiving an analysis report, wherein the analysis report identifies, based on the prompt, potential threats and remediation steps.

16. The non-transitory machine-readable storage medium of claim 15, wherein generating the prompt is based on derived context and guidance of at least the telemetry data, the contextual data, and the organizational data.

17. The non-transitory machine-readable storage medium of claim 15, wherein the key details comprise one of process IDs, code signing information, users, and command line arguments for each process associated with the suspicious activity alert.

18. The non-transitory machine-readable storage medium of claim 15, wherein identifying the telemetry data comprises focusing on relevant factors comprising one of related processes, users, and network activity.

19. The non-transitory machine-readable storage medium of claim 15, further comprising searching a threat feed service to retrieve related information associated with the process data.

20. The non-transitory machine-readable storage medium of claim 15, wherein the prompt comprises a system message and a user message, wherein the system message is static and the user message is dynamically generated based on a detected event that triggers the suspicious activity alert.

* * * * *